United States Patent [19]

Yamaguchi et al.

[11] Patent Number: 5,896,025
[45] Date of Patent: Apr. 20, 1999

[54] SECONDARY BATTERY PROTECTION DEVICE FROM OVERCHARGE/OVERDISCHARGE

[75] Inventors: Takeshi Yamaguchi, Fuchu; Yosifumi Sakaguchi; Shinji Tanaka, both of Ome; Takehisa Yokohama, Higashiyamato; Kouichi Horisaki, Ibaraki-ken; Eiji Matsumasa, Kyoto, all of Japan

[73] Assignees: Hitachi Maxell, Ltd., Osaka; Hitachi Microcomputer System, Ltd., Tokyo, both of Japan

[21] Appl. No.: 08/777,965

[22] Filed: Dec. 24, 1996

[30] Foreign Application Priority Data

Dec. 27, 1995 [JP] Japan .................. 7-352118

[51] Int. Cl.$^6$ ......................................... H02J 7/00
[52] U.S. Cl. .................. 320/134; 320/136; 320/164
[58] Field of Search ................... 320/DIG. 12, 134, 320/136, 163, 164, 116, 118; 429/7, 61

[56] References Cited

U.S. PATENT DOCUMENTS

| | | | |
|---|---|---|---|
| 5,493,197 | 2/1996 | Eguchi et al. | 320/134 |
| 5,547,775 | 8/1996 | Eguchi et al. | 320/118 |
| 5,705,911 | 1/1998 | Tamai | 320/134 |
| 5,742,148 | 4/1998 | Sudo et al. | 320/134 |

OTHER PUBLICATIONS

Nikkei Electronics, No. 649, Nov. 20, 1995, pp. 100–117.

*Primary Examiner*—Peter S. Wong
*Assistant Examiner*—K. Shin
*Attorney, Agent, or Firm*—Fay, Sharpe, Beall, Fagan, Minnich & McKee

[57] ABSTRACT

A protection circuit device for protecting a secondary battery from an overcharge and/or an overdischarge has first and second terminals, across which a charger and a load are alternatively connectable. A first switch and/or a second switch may be provided in series with the secondary battery between the first and second terminals. In a charging operation mode, the second switch is kept conductive. A charging operation is performed with the first switch made conductive. When the battery is overcharged for some reasons, the first switch is turned off. Upon connection of a load across the first and second terminals, the first switch is restored to a conductive state for a discharging operation which releases the battery from an overdischarge state. In a discharging operation mode, the first switch is kept conductive. A discharge operation is performed with the second switch made conductive. When the battery is overdischarged, the second switch is caused to remain conductive even after commencement of the overdischarge, so that the battery can continue the discharge operation if the temporary overdischarge does not last longer than the predetermined period of time.

21 Claims, 6 Drawing Sheets

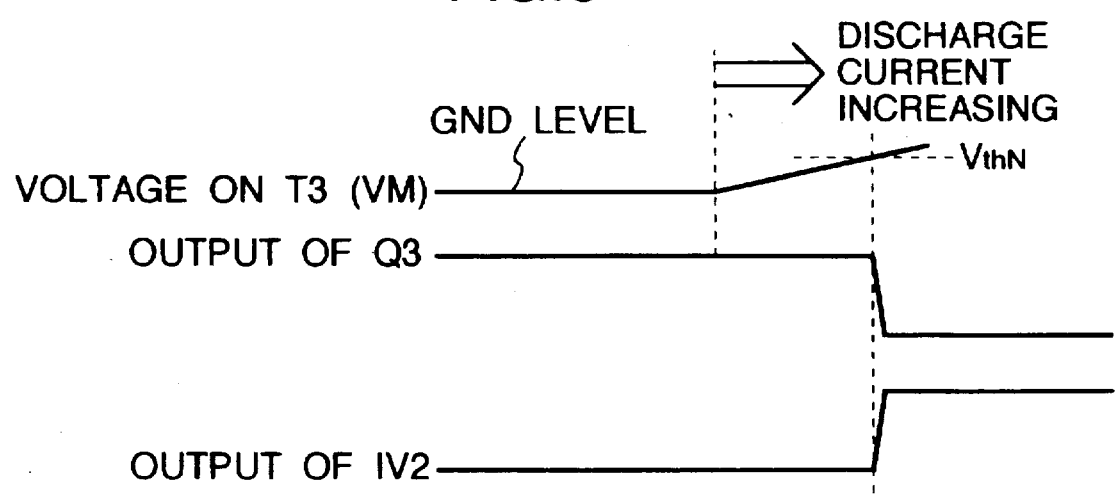

SECONDARY BATTERY PROTECTION DEVICE FROM OVERCHARGE/ OVERDISCHARGE

BACKGROUND OF THE INVENTION

The present invention relates in general to a secondary battery protection circuit device, and more particularly to a circuit device for protecting a secondary battery from overcharge and (or) overdischarge, and further to a battery pack having such a secondary battery protection circuit device and a secondary battery.

As for an example of a secondary battery employed in a portable electronic apparatus, there is well known a Li ion secondary battery. Since the Li ion secondary battery contains therein a combustible electrolyte, if the secondary battery undergoes an overcharge by mistake, then a metal Li is separated, which may result in an accident such as an explosion occurring in some cases. In addition, if the secondary battery undergoes an overcharge by mistake, then the usable number of times of repetitive charges/discharges will be remarkably decreased. For this reason, there is employed a protection switch including a power MOSFET and the like for disconnecting a secondary battery from the electronic apparatus when detecting an overcharge or overdischarge. An example of a Li ion secondary battery including such a protection switch is described in "NIKKEI ELECTRONICS" issued by Nikkei BP Company, Nov. 20, 1995, pp.100 to 117.

When a Li ion secondary battery undergoes an overcharge due to some cause or other such as a design mistake or malperformance of a charger, a power MOSFET in the protection circuit included in the battery pack operates so as to disconnect the secondary battery from the charger. However, for a user who is not aware of the function of such a secondary battery pack at all, there arises a problem that when connecting an electronic apparatus as a load to the secondary battery pack in order to operate the electronic apparatus, since the above-mentioned MOSFET remains in an off state, a sufficient voltage and current will not be obtained so that the user misunderstands the battery pack just as if the performance of the battery pack itself is degraded. This results in a reduction of the convenience of the battery pack in use.

SUMMARY OF THE INVENTION

It is an object of the present invention to provide a secondary battery protection circuit device in which the convenience in use of a battery pack is improved while ensuring the safety thereof.

According to one aspect of the present invention, a protection circuit device for protecting a secondary battery from an overcharge and/or an overdischarge has first and second terminals, across which a charger and a load are alternatively connectable. Electric current flows into the first terminal and flows out from the second terminal in a charging operation mode while electric current flows out from the first terminal and flows into the second terminal in a discharging operation mode. A first switch and/or a second switch (connected in series with the first switch) may be provided in a current path at the second terminal side. In the charging operation mode, the second switch, if provided, is kept conductive. A charging operation is performed with the first switch made conductive. When the battery is overcharged for some reasons, the first switch is turned off. Upon connection of a load across the first and second terminals, the first switch is restored to a conductive state for a discharging operation which releases the battery from an overdischarge state. In a discharging operation mode, the first switch, if provided, is kept conductive. A discharge operation is performed with the second switch made conductive. When the battery is overdischarged, the second switch is caused to remain conductive even after commencement of the overdischarge, so that the battery can continue the discharge operation if the overdischarge does not last longer than a predetermined period of time. If the overdischarge lasts longer than the predetermined period of time, the second switch is made non-conductive to stop the discharging operation.

According to another aspect of the present invention, in a circuit device for protecting a secondary battery having first and second terminals between which a charger or load is alternatively connected, an overcharge voltage of a battery voltage is detected by a first voltage detection circuit, a voltage at the second terminal, which acted as a negative electrode in the charging operation mode, is detected by a second voltage detection circuit when a load is connected between the first and second terminals, a latch is reset on the basis of a detection signal of the first voltage detection circuit, the latch is set on the basis of a detection signal of the second voltage detection circuit, an overcharge protection switch which is inserted in series with a current flow path on the second terminal side is turned on on the basis of a reset output signal of the latch, the overcharge protection switch is returned back to an on state on the basis of a set output of the latch, and a unidirectional element which is designed in such a way as to cause a current to flow therethrough in a direction opposite to the direction of current flow in the charging operation mode is provided in parallel with the switch.

According to another aspect of the present invention, there is provided a protection circuit device for protecting a secondary battery from an overcharge, having first and second terminals across which a charger is connectable, wherein electric current flows into the first terminal and flows out from the second terminal in a charging operation mode while electric current flows out from the first terminal and flows into the second terminal in a discharging operation mode, the device comprising:

a voltage divider having first and second ends electrically connected to the first and second terminals, respectively, a secondary battery being connectable across the first and second ends of the voltage divider to provide a terminal voltage signal representative of a terminal voltage of the secondary battery, a first detector connected to the voltage divider for receiving the terminal voltage signal, the first detector generating an overcharge detection signal when the terminal voltage signal exceeds a first reference voltage in the charging operation mode;

a second detector connected to the second terminal, the second comparator generating a release signal when a voltage on the second terminal exceeds a second reference voltage in the discharging operation mode;

a switch connected between the second end of the voltage divider and the second terminal;

a diode connected in parallel with the switch, the diode being connected to have a forward bias direction concurrent with a direction of current flow in the discharging operation mode; and a controller connected to receive the overcharge detection signal from the first detector and the release signal from the second detector for on-off controlling the switch, the controller being operative to turn on the switch to a conductive state to start a charging operation when the charger is connected across the first and second terminals, being responsive to the overcharge detection signal from the first detector to turn off the switch in the charging operation, and being responsive to the release signal from the second detector to turn on the switch to restore it to the conductive state when the load is connected across the first and second terminals instead of the charger.

According to another aspect of the present invention, there is provided a protection circuit device for protecting a secondary battery from an overdischarge, having first and second terminals across which a load is connectable, wherein electric current flows out from the first terminal and flows into the second terminal in a discharging operation mode, the device comprising:

- a voltage divider having first and second ends electrically connected to the first and second terminals, respectively, a secondary battery being connectable across the first and second ends of the voltage divider to provide a terminal voltage signal representative of a terminal voltage of the secondary battery;
- a detector connected to the voltage divider for receiving the terminal voltage signal, the detector generating an overdischarge detection signal when the terminal voltage signal decrease below a reference voltage in the discharging operation mode;
- a switch connected between the second end of the voltage divider and the second terminal;
- a diode connected in parallel with the switch, the diode being connected to have a forward bias direction opposite to a direction of current flow in the discharging operation mode; and
- a controller connected to receive the overdischarge detection signal from the detector for on-off controlling the switch, the controller being responsive to an absence of the overvoltage detection signal to turn on the switch to start a discharging operation when the load is connected across the first and second terminals, and being responsive to the overdischarge detection signal to turn off the switch when the overdischarge detection signal lasts a predetermined period of time.

BRIEF DESCRIPTION OF THE DRAWINGS

FIG. 6 is a waveform chart useful in explaining the operation of the part of the circuit device shown in FIG. 5.

DESCRIPTION OF THE PREFERRED EMBODIMENTS

Figure 1:
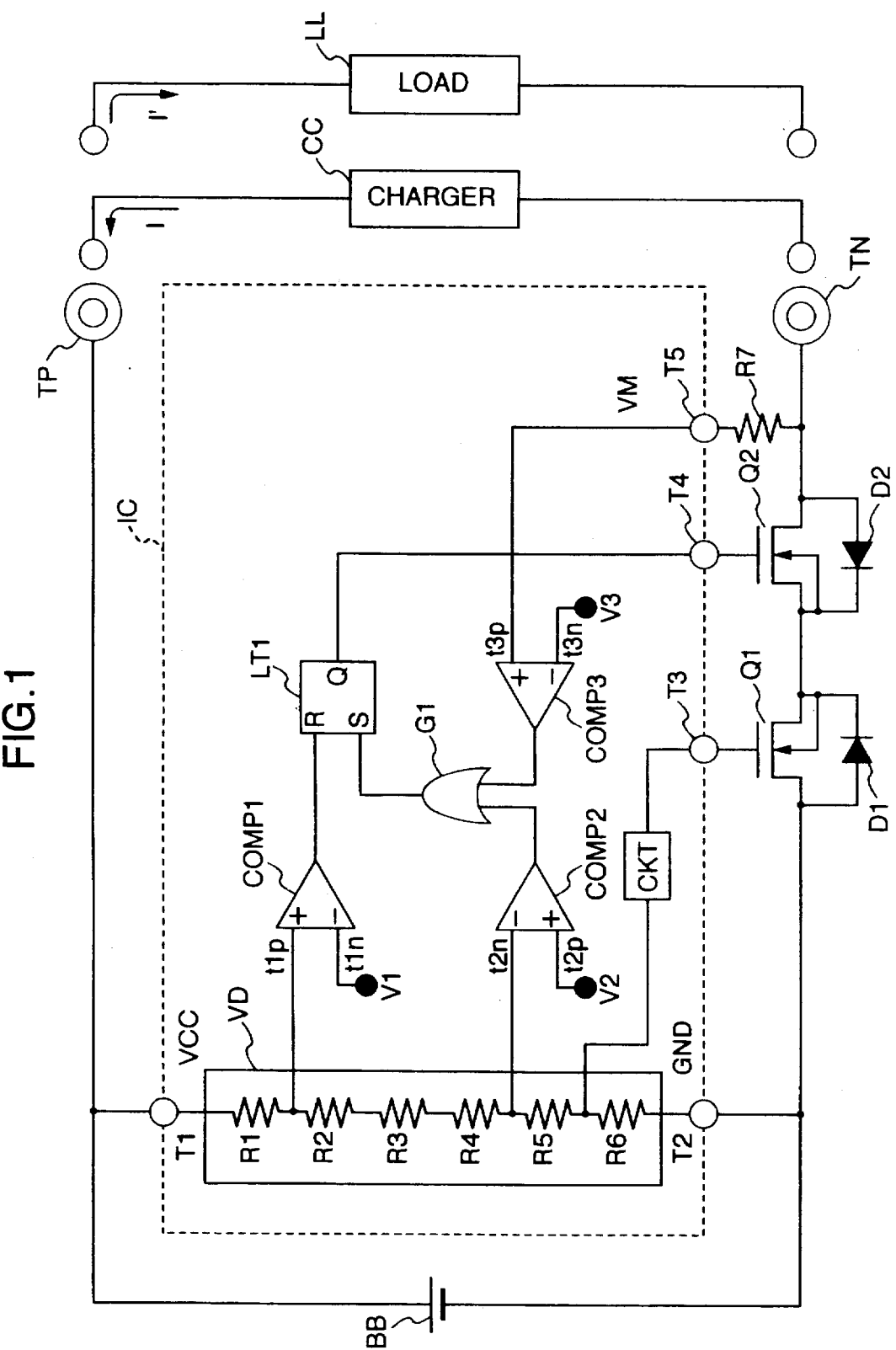
FIG. 1 is a circuit diagram, partly in block diagram, showing a configuration of a secondary battery protection circuit device according to an embodiment of the present invention.
Figure 2:
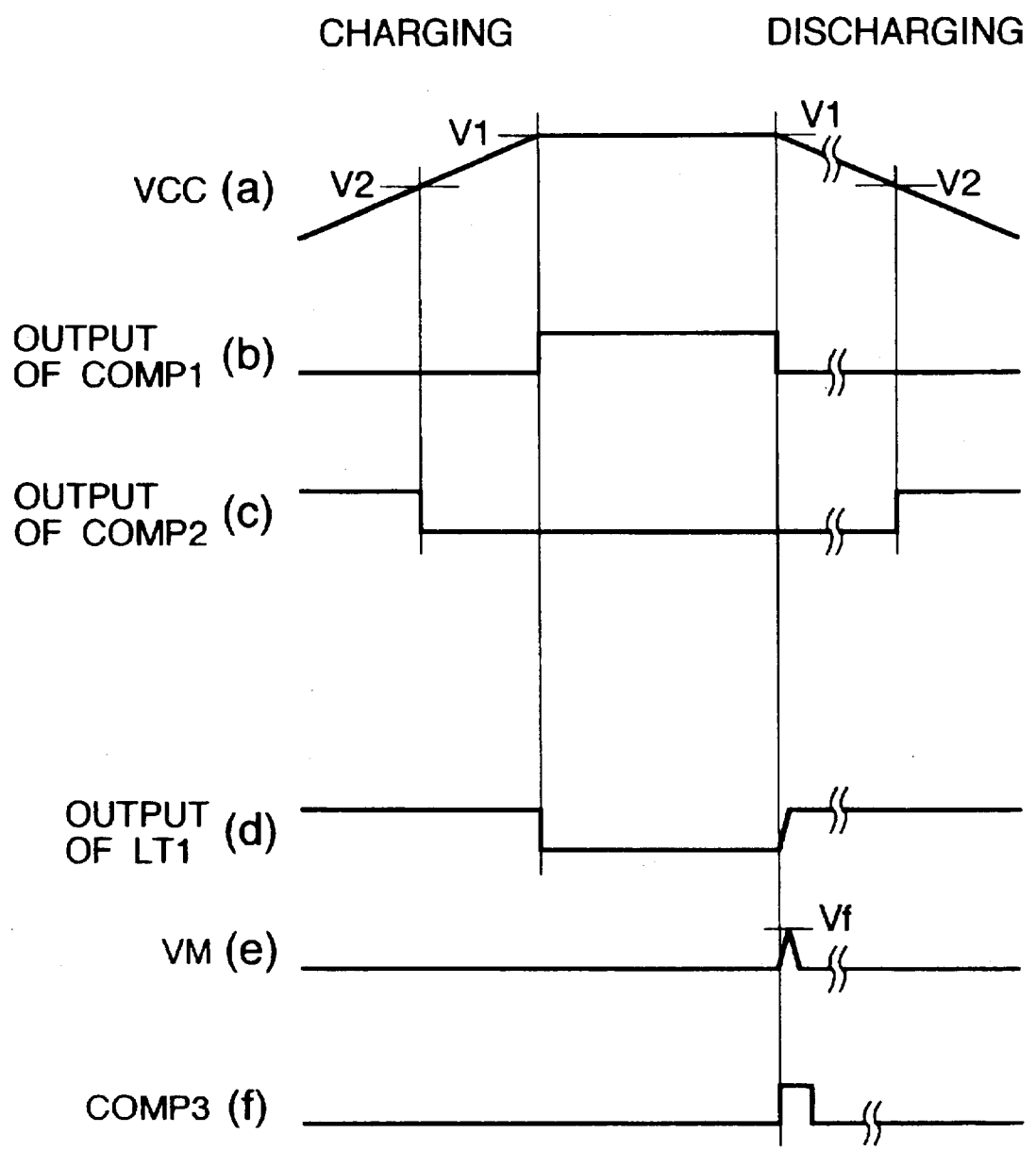
FIG. 2 is a waveform chart useful in explaining the operation of the secondary battery protection circuit device shown in FIG. 1.

Referring first to FIG. 1, there is illustrated a circuit diagram showing a configuration of a protection circuit device for protecting a secondary battery from overcharge and (or) overdischarge according to an embodiment of the present invention. In the figure, elements surrounded by the dotted lines are formed on one semiconductor substrate such as a monocrystalline silicon substrate utilizing the well known technology of manufacturing a semiconductor integrated circuit. Referring to FIG. 2, there is illustrated a waveform chart useful in explaining the operation of the circuit device shown in FIG. 1.

While not specifically limited, a battery BB is a secondary battery such as a Li ion secondary battery in which if it undergoes an overcharge, an accident may occur in some cases. The voltage (terminal voltage) developed across both terminals of such a secondary battery is applied across IC external terminals T1 and T2 of a semiconductor integrated circuit device IC constituting the main portion of the protection circuit device in order to be monitored therein. A battery pack includes the protection circuit device and the secondary battery. The positive side electrode of the secondary battery is directly connected to a first terminal TP of the protection circuit device. Protection switches Q1 and Q2 each of which is comprised of an insulated gate field effect transistor such as a MOSFET are connected in series between the negative side electrode of the secondary battery and a second terminal TN of the protection circuit device. In other words, the source to drain current paths of the transistors Q1 and Q2 are connected in series between the IC external terminal T2 and the second terminal TN. In this connection, the MOSFET Q1 is the discharge protecting switch, while the MOSFET Q2 is the charge protecting switch. Both sources of the MOSFETs Q1 and Q2 are connected to the substrate (channel). For this reason, the PN junctions between the drains and the channel are respectively provided in the form of parasitic diodes D1 and D2 in parallel with the MOSFETs Q1 and Q2. The diodes D1 and D2 are connected in such a way that the forward bias direction of the diode D1 is opposite to the direction of current flow in the discharging operation mode while the forward bias direction of the diode D2 is concurrent with that of current flow in the discharging operation mode.

In the above-mentioned semiconductor integrated circuit device IC, the battery voltage (terminal voltage) developed across the IC external terminals T1 and T2 is divided by a voltage divider VD including series-connected resistors R1 to R6 which are connected between the IC external terminals T1 and T2. While not specifically limited, the division voltage at a connection point between the adjacent resistors R1 and R2 is supplied to one non-inverted input terminal t1p of a voltage comparison circuit COMP1. A first end of the voltage divider VD is connected to the IC external terminal T1, and a second end thereof is connected to the IC external terminal T2. A reference voltage V1 which has been generated in a reference voltage generating circuit (not shown) is supplied to the other inverted input terminal t1n of the voltage comparison circuit COMP1. The voltage comparison circuit COMP1 constitutes a first voltage detector. The output signal (overcharge detection signal) of the first voltage detector is supplied to a reset terminal R of a latch LT1. A latch output signal (control signal) outputted through an output terminal Q of the latch LT1 goes to a high level when the latch LT1 is in a set state, while goes to a low level when it is in a reset state. The control signal outputted from the latch LT1 is supplied to a gate of the MOSFET Q2 as the overcharge protecting switch through an IC external terminal T4 of the semiconductor integrated circuit IC. In such a way, a voltage comparison circuit COMP2, an OR gate circuit G1 and the latch LT1 constitute a controller for on-off controlling the switch Q2.

While not specifically limited, the division voltage at a connection point between the adjacent resistors R4 and R5 of the voltage divider VD is supplied to one inverted input terminal t2n of the voltage comparison circuit COMP2. A reference voltage V2 which has been generated in a reference voltage generating circuit (not shown) is supplied to the other non-inverted input terminal t2p of the voltage comparison circuit COMP2. The voltage comparison circuit COMP2 constitute a third voltage detector. The output signal of the voltage comparison circuit COMP2 is supplied to a set terminal S of the latch LT1 through the OR (logical sum) gate circuit G1. The above-mentioned reference voltage V2 is set so as to correspond to a voltage below which the secondary battery should accept a charging operation. In other words, when during the discharging operation, the division voltage (battery voltage) is decreased and hence a charger CC is connected to the battery pack, if the division voltage thus decreased is lower than the reference voltage V2, then the output signal of the voltage comparison circuit COMP2 goes to a high level (i.e., a charge start voltage detection signal is generated) so as to set the latch LT1. Then, the overcharge protecting switch (MOSFET) Q2 is turned on on the basis of the output signal outputted through the output terminal Q of the latch LT1 (refer to left half of FIGS. 2(a), 2(c) and 2(d)). In this connection, as described above, the latch LT1, the voltage comparison circuit COMP2 and the gate circuit G1 constitute the controller for on-off controlling the switch Q2.

In the present embodiment, when the secondary battery BB undergoes the overcharge by mistake in the charging operation, the voltage comparison circuit COMP1 detects the overcharge of the secondary battery to generate the overcharge detection signal, thereby resetting the latch LT1 to turn the overcharge protecting switch (MOSFET) Q2 off. The switch Q2 is provided in order to prevent occurrence of an accident due to the heating or the like resulting from separation of Li metal within the secondary battery. Therefore, no problem will be raised if a load LL is connected between the first and second terminals TP and TN in order to discharge the secondary battery BB in such a state. By paying attention to the fact that the secondary battery is desirably discharged in order to return the secondary battery back to the normal state, the protection circuit device is provided with a function of responding to a connection of the load to the battery pack, as will be described below. Incidentally, when the protection circuit device shown in FIG. 1 is in the operation mode of the protecting the secondary battery from the overcharge, as apparent from the description which will be given later with reference to FIG. 3, the overdischarge protecting switch Q1 is kept conductive at all times. Alternately, the switch Q1 and a circuit CKT connected thereto may be omitted. In such a case, the IC external terminal T2 is directly connected to a source of the switch Q2, and also no element is connected to the IC external terminal T3.

After the secondary battery BB has been charged, if instead of the charger CC, the load LL is connected between the first and second terminals TP and TN, then the electric potential at the output side of the switch Q2, in other words, at the negative terminal TN of the battery pack is applied to the inside of the semiconductor integrated circuit IC through the IC external terminal T5 and is then supplied to one non-inverted input terminal t3p of the voltage comparison circuit COMP3. A reference voltage V3 which has been generated in a reference voltage generating circuit (not shown) is supplied to the other inverted input terminal t3n of the voltage comparison circuit COMP3. The reference voltage V3 is set to a relatively low electric potential which is used to detect the forward voltage Vf of the parasitic diode D2. The voltage comparison circuit COMP3 constitutes a second voltage detector.

As shown in FIG. 2, (a), (b) and (d), if the secondary battery undergoes an overcharge in the charging operation, then the latch LT1 is reset on the basis of the overcharge detection signal outputted from the voltage comparison circuit COMP1, and as a result, the MOSFET Q2 is turned off. Under this condition, if the load (electronic apparatus) LL is connected between the terminals TP and TN of the battery pack, since as will be described later, the overdischarge protecting switch MOSFET Q1 which may be connected in series with the MOSFET Q2 is in an on state under the overvoltage condition, a current is caused to flow into the negative electrode side of the secondary battery through the parasitic diode D2 for the grounding electric potential of the circuit device with the electric potential at the IC external terminal T2 as the reference and hence the electric potential at the second terminal TN of the battery pack is increased by the forward voltage Vf of the parasitic diode D2.

The voltage comparison circuit COMP3 detects the above-mentioned discharge path thus formed, in other words, detects the increase of the electric potential at the second terminal TN of the battery pack as the voltage VM (refer to FIG. 2(e)) at the IC external terminal T5 so as to change its output signal from a low level to a high level (generate a release signal (refer to FIG. 2(f)). As a result, since the latch LT1 in the reset state is inverted to the set state through the OR gate circuit G1, its output signal (control signal) outputted through the output terminal Q is changed from a low level to a high level so as to turn the MOSFET Q2 on again (refer to FIG. 2(d)) so that a current can be supplied to the load LL. By the discharging operation due to the connection of the load to the battery pack, the overcharging state is automatically released to return the output signal of the voltage comparison circuit COMP1 back to a low level. Incidentally, a resistor R7 is provided between the second terminal TN of the battery pack and the IC external terminal T5 in order to prevent the semiconductor integrated circuit device from being electrostatically broken. However, if there is not such a possibility, the resistor R7 may be omitted.

Figure 3:
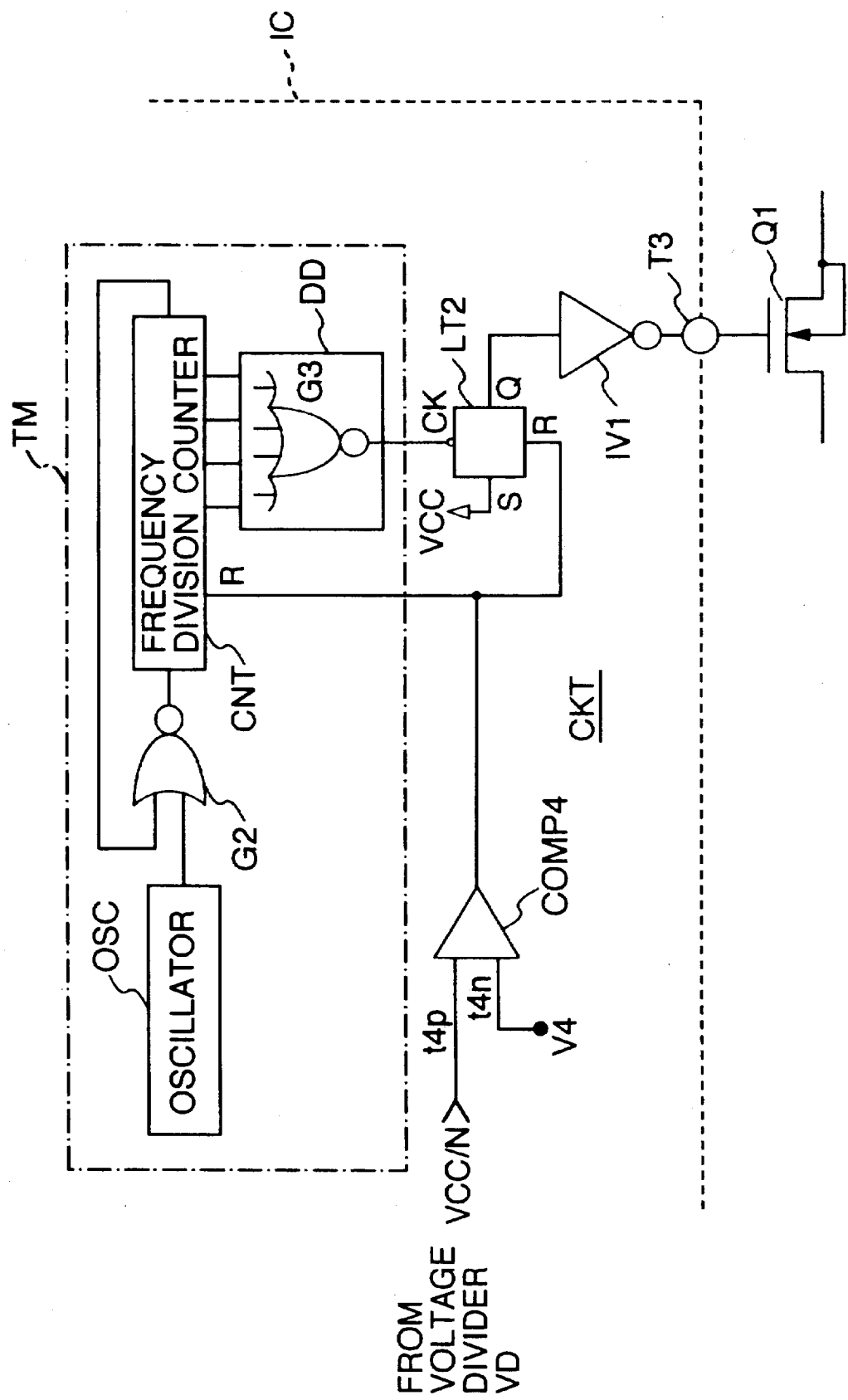
FIG. 3 is a circuit diagram, partly in block diagram, showing a configuration of a part of the circuit device shown in FIG. 1.
Figure 4:
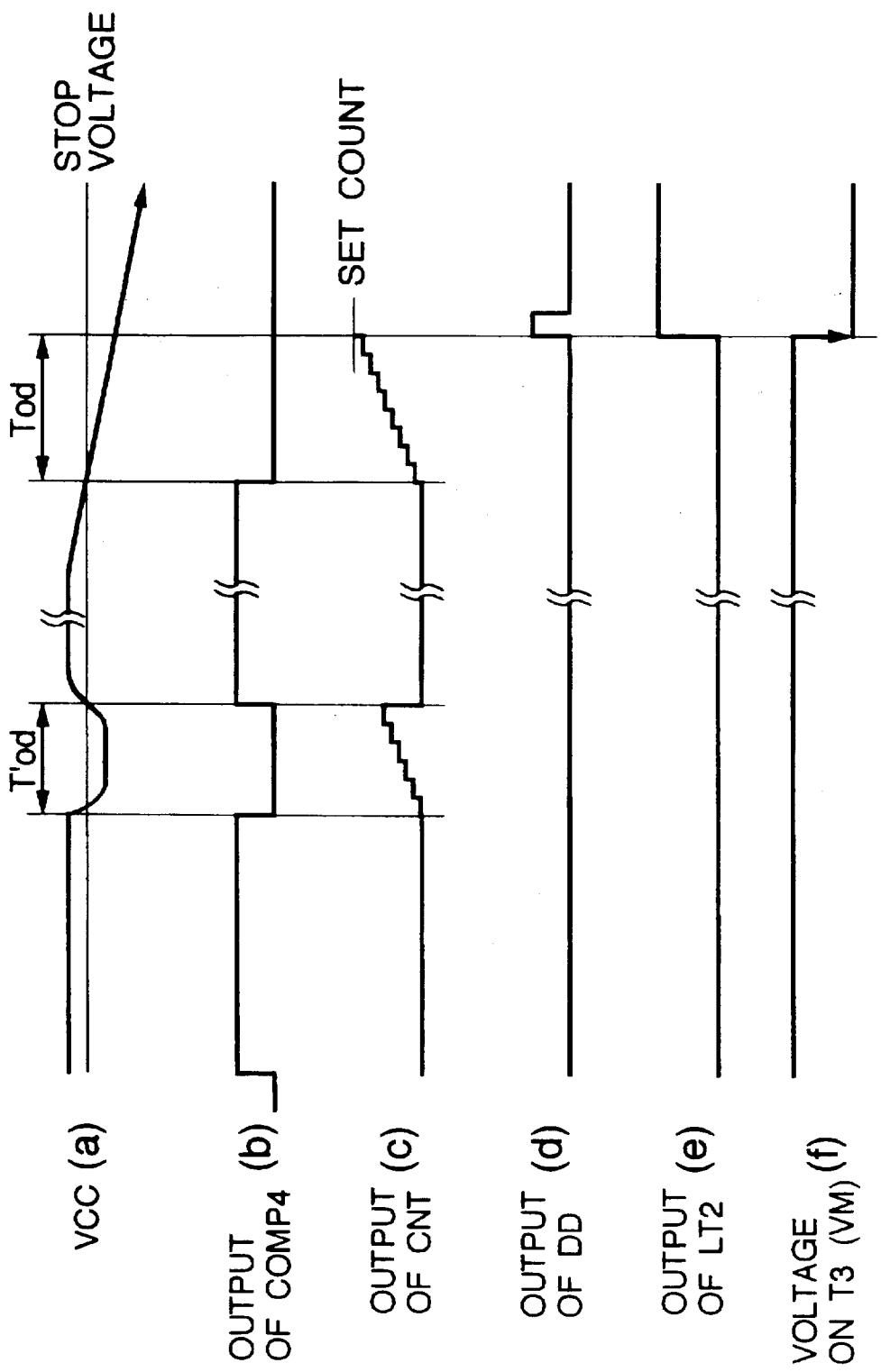
FIG. 4 is a waveform chart useful in explaining the operation of the part of the circuit device shown in FIG. 3.

Next, referring to FIG. 3, there is illustrated a circuit diagram showing a configuration of an embodiment of the part CKT of the protection circuit device for controlling the overdischarge protecting switch (MOSFET) Q1. The switch Q1 is provided in order to prevent the overdischarge of the secondary battery BB. For judging such overdischarge of the secondary battery BB, as shown in FIG. 4, if the battery voltage VCC becomes near a stop voltage with which the discharging operation should be stopped, then its voltage margin will be decreased. At this time, if the abrupt load fluctuation occurs, in other words, the overcurrent is caused to flow through the load, the battery voltage VCC becomes temporarily equal to or lower than the stop voltage due to the internal impedance of the secondary battery (refer to a time period of T'od of FIG. 4, (a)). Then, there is a possibility that the discharge voltage itself may be judged to be equal to or lower than the stop voltage by mistake.

In order to prevent such malfunction to enable the discharging operation to continue up to the level of the stop voltage of the secondary battery, in other words, in order to increase the substantial battery life, the following timer circuit is provided.

In the discharging operation of the secondary battery, a voltage comparison circuit COMP4 compares the division voltage VCC/N which has been obtained from a connection point between the adjacent resistors R5 and R6, for example, of the voltage divider VD constituted by the series-connected resistors R1 to R6 and then is inputted to a non-inverted input terminal t4p with a reference voltage V4 which has been generated in a reference voltage generating circuit (not shown) so as to correspond to the stop voltage in relation to that division voltage and then is inputted to an inverted input terminal t4n. When the battery voltage VCC (refer to FIG. 4(a)) becomes equal to or lower than the stop voltage, the voltage comparison circuit COMP4 outputs a detection signal at a low level (overdischarge detection signal)(refer to FIG. 4(b)). The detection signal may also be outputted in response to even a temporary overcurrent as described above. The voltage comparison circuit COMP4 constitutes a fourth voltage detector.

On the basis of the overdischarge detection signal outputted from the voltage comparison circuit COMP4, the overdischarge protecting switch Q1 is not immediately turned off, but it is judged whether or not the overdischarge detection signal lasts for a predetermined time period (refer to Tod in FIG. 4(a)) which is set by a timer circuit TM. The timer circuit TM includes an oscillation circuit OSC, a NOR gate G2, a frequency division counter CNT and a decoder circuit DD which are included in the semiconductor integrated circuit device $_{IC}$. The oscillation pulses generated from the oscillator circuit OSC are supplied to the frequency division counter CNT. During the normal discharging operation, an output signal at a high level outputted from the voltage comparison circuit COMP4 is supplied to both a reset terminal R of the frequency division counter CNT and a reset terminal R of a latch LT2 which will be described later so as to forcedly make the frequency division counter CNT and the latch circuit LT2 in a reset state.

If during the discharging operation, an output signal outputted from the voltage comparison circuit COMP4 goes to a low level so that it is judged that the battery voltage VCC is decreased down to a level equal to or lower than the stop voltage, then the frequency division counter CNT is freed from the reset state for a time period during which the output signal from the voltage comparison circuit COMP4 is kept at a low level, and the frequency division counter CNT carries out an operation of counting the oscillation pulses (refer to FIGS. 4(b) and 4(c)). The counting output of the frequency division counter CNT is supplied to the decoder circuit DD, including a gate circuit G3 for example, which judges the pulse count value corresponding to the above-mentioned time period thus set. If the battery voltage VCC is returned back to the original level before reaching the above-mentioned count value (refer to T'od in FIG. 4(a)), then the division voltage VCC/N becomes larger than the reference voltage V4 and also a reset output signal is outputted from the voltage comparison circuit COMP4 to reset the frequency division counter CNT (and the latch LT2) in the middle of the counting operation. Therefore, if the time required for the counting in the decoder circuit DD is set to a relatively long time by paying attention to the load fluctuation, even when the battery voltage VCC is temporarily decreased down to a level equal to or lower than the stop voltage in correspondence to the load fluctuation, it is disregarded. In this connection, the timer circuit TM, the latch LT2 and an inverter circuit IV1 constitute a controller for on-off controlling the switch Q1.

While not specifically limited, an output signal of the decoder circuit DD is, as the pulse counting signal (refer to FIG. 4(d)) of the timer circuit TM, supplied to a clock terminal CK of the latch LT2. The power source voltage VCC at a high level is regularly supplied to a set input terminal S of the latch LT2 and the latch LT2 is set at a time point when the output signal (refer to FIG. 4(d)) of the decoder circuit DD is supplied to the clock terminal CK. An output signal (refer to FIG. 4(e)) of the latch LT2 is changed to a high level on the basis of the above-mentioned set state, which causes the electric potential at a gate of the overdischarge protecting switch MOSFET Q1 to go to a low level through both the inverter circuit IV1 as the driver and the IC external terminal T3 to turn the switch Q1 off. That is, the switch Q1 is conducting as long as the voltage developed across the terminals of the secondary battery is not equal to or is not lower than the stop voltage. The output signal of the voltage comparison circuit COMP4 is supplied to the reset terminal R of the latch LT2. Therefore, if during the discharging operation, the battery voltage VCC is returned from the state in which it has been temporarily decreased down to a level equal to or lower than the stop voltage back to the original state, or the battery voltage VCC is recovered to a level equal to or higher than the stop voltage through the charging operation, the latch LT2 has been reset. The charge current until the latch LT2 is reset is caused to flow through the parasitic diode D1 between the source and the drain of the switch MOSFET Q1 since the MOSFET Q1 is in an off state. Incidentally, in the case where the protection circuit device shown in FIG. 1 is in the operation mode of protecting the secondary battery from the overdischarge, the overcharge protecting switch Q2 is kept conductive at all times since the latch LT1 is set on the basis of the output signal of the third voltage comparison circuit COMP2. Alternately, the switch Q2, and the voltage comparison circuits COMP1, COMP2 and COMP3, the gate circuit G1 and the latch LT1 which are connected to the switch Q1 may be omitted. In such a case, the second terminal TN is directly connected to the source of the switch Q1 and also no element is connected to the IC external terminal T4.

In order to reduce the current consumption in the above-mentioned frequency division counter CNT, a NOR gate circuit G2 which is provided between the input terminal of the frequency division counter CNT and the oscillation circuit OSC is controlled so as to be disabled on the basis of a carry signal of the frequency division counter CNT. As a result, it is stopped to input the oscillation pulses to the frequency division counter CNT. In other words, if the battery voltage VCC is decreased down to a level equal to or lower than the stop voltage so that the frequency division counter CNT carries out the maximum counting operation, the following useless counting operation of the timer circuit TM is stopped, so that it is possible to reduce the current consumption.

The load fluctuation in the discharging operation mode is varied in correspondence to the various kinds of electronic circuits mounted on the electronic apparatus in which the battery pack is used. For example, in the electronic apparatus to which a motor driver is mounted, since the time required for actuating a motor becomes clear in correspondence to the performance of the motor, in the timer circuit which is mounted to the battery pack to which such a load is connected, the time period Tod is set so as to be longer than the time period of the load fluctuation. In this way, since the time period T'od when the battery voltage is temporarily decreased is varying in correspondence to the load of interest, while not specifically limited, the relation between the configuration of the gate circuit G3 included in the decoder circuit DD and the output value of the frequency division counter CNT can be programmably set in correspondence to the load, in other words, in correspondence to the application of the battery pack by the master slice method.

In order to further increase the degree of freedom for setting the time period (Tod) as described above, in other words, in order to enable the time to be set even after manufacturing the protection IC, a circuit is mounted in which a current is caused to flow through fuses formed of a polysilicon layer or the like in order to selectively cut fuses. In this connection, the time setting may be carried out by the selective cutting of the fuses. Alternately, the procedure may be adopted in which an external terminal for time setting is provided, and a signal at a high level/low level is supplied to the IC external terminal, thereby carrying out time setting.

It is also considered that the above-mentioned timer circuit TM may be implemented in the form of a circuit in which both the output signal of the above-mentioned voltage comparison circuit COMP4 and the delay signal thereof are supplied to a logic circuit in order to nullify the output signal within the delay time. However, in such a circuit, there arises a problem associated therewith that a relatively large scale time constant circuit must be formed in the semiconductor integrated circuit in order to produce the delay signal, and hence the number of discrete components such as a capacitor and the like is necessarily increased. If a capacitor is self-contained in the semiconductor integrated circuit, then the setting time will be fixed. As a result, plural kinds of protection ICs must be prepared.

The effects which are obtained from the above-mentioned embodiment are as follows.

(1) In the protection circuit device for the secondary battery, an overvoltage of the battery voltage is detected by the first voltage detection circuit COMP1, an increase of the electric potential at the second terminal of the protection circuit device is detected by the second voltage detection circuit COMP3, the latch LT1 is reset on the basis of the detection signal of the first voltage detection circuit, the latch LT1 is set on the basis of the detection signal of the second voltage detection circuit, the overcharge protecting switch Q2 which is inserted in series with the current path on the second terminal TN side is turned off on the basis of the reset output of the latch and also is returned back to the on state on the basis of the set output of the latch, and the unidirectional element D2 arranged to cause a current to flow therethrough in a direction opposite to the direction of current flow during charging of the secondary battery is provided between the terminals of the overcharge protecting switch, whereby even when the switch Q2 is in an off state, the switch Q2 is returned back to the on state by connecting a load to the battery pack and hence the electric charges can be discharged to the load.

(2) The detection signal of the second voltage detection circuit COMP3 is supplied together with the detection signal, which is used to carry out a charging operation when the battery voltage is judged to be equal to or lower than the specified voltage, to the latch LT1 through the OR gate circuit G1 so as to invert the latch LT1 to the other level, whereby in the normal operation, the overcharge protecting switch MOSFET Q2 can be turned on in the normal state by the above-mentioned common latch.

(3) The protection circuit device is incorporated integrally with the Li ion battery in the form of the battery pack, whereby both the safety and the convenience in use can be improved.

(4) The overdischarge protecting switch MOSFET Q1 is connected in series between the overcharge protecting switch Q2 and the negative electrode of the secondary battery or the IC external terminal T2, and the overdischarge protecting switch Q1 is turned off on the basis of the detection signal of the fourth voltage detection circuit COMP4 for detecting the stop voltage of the secondary battery, whereby the secondary battery can be protected from both the overcharge and the overdischarge.

While the present invention made by the present inventors has been described in detail with respect to the preferred embodiments thereof, it is to be understood that the present invention is not limited to the above-mentioned preferred embodiments, and hence various changes and modifications will be possible without departing from the scope and true spirit of the invention. For example, as for the switch devices Q1 and Q2, instead of MOSFETs, bipolar type transistors or any other type switch devices may be employed. While in the case of the above-mentioned MOSFET, the parasitic diode formed between the source and the drain of the MOSFET are used, if such parasitic diodes are not available, then separate diodes through which a current substantially equal to the current in the case of the parasitic diodes flow may be provided in parallel with the respective switches.

In addition to the circuit employing the voltage comparison circuit as described above, in order to detect the increase of the electric potential at the negative terminal (second terminal) TN of the battery pack corresponding to the forward voltage of the parasitic diode D2 for example, the second voltage detection circuit COMP3 may also be a circuit utilizing a threshold voltage of an insulated gate field effect transistor such as a MOSFET.

Figure 5:
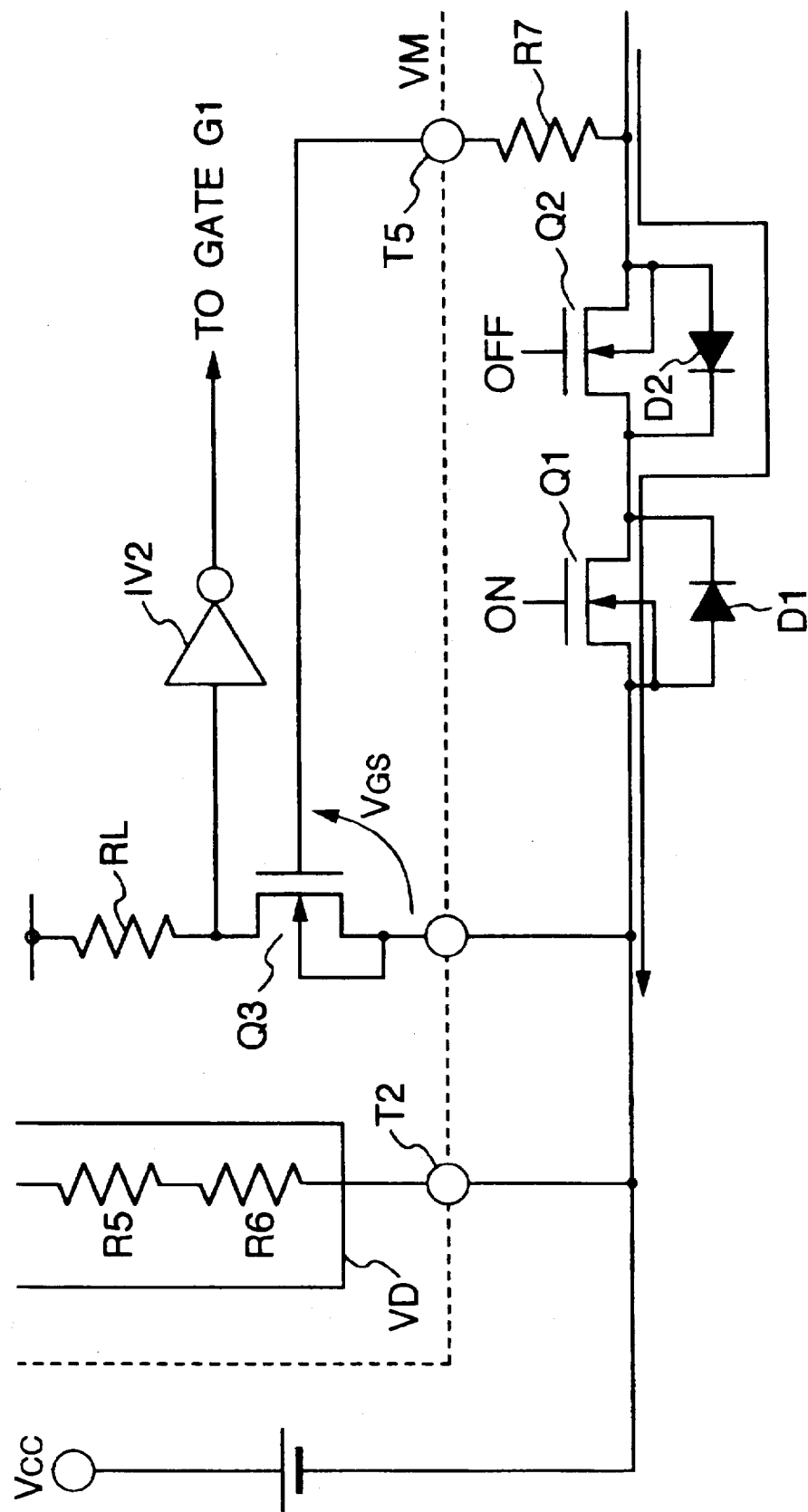
FIG. 5 is a circuit diagram showing a configuration of a part of a secondary battery protection circuit device according to another embodiment of the present invention.

That is, there may be adopted an alternate circuit wherein as shown in FIG. 5, the voltage VM at the IC external terminal T5 is supplied to a gate of an N-channel MOSFET Q3 which has a threshold voltage VthN lower than the forward voltage of the parasitic diode D2, the grounding electric potential of the circuit device corresponding to the electric potential at the negative terminal of the secondary battery is supplied to a source of the MOSFET Q3 (i.e., the source is connected to the IC external terminal T2 to which the second end of the voltage divider VD is connected), a detection signal at a low level/high level corresponding to the on state/off state is outputted from a drain of the MOSFET Q3 and then the detection signal is inverted by an inverter circuit IV2 so as to be used as the set signal (release signal). Referring to FIG. 6, there is illustrated a time chart showing changes of the drain voltage of the MOSFET Q3 and the output signal of the inverter circuit IV2 with respect to the change in the electric potential VM at the IC external terminal T5. Incidentally, in FIG. 5, reference symbol RL designates a load resistor for the MOSFET Q3.

The reference voltages supplied to the above-mentioned voltage comparison circuits may be identical to each other, i.e., they may be at a common constant voltage. In this case, with such a common constant voltage as the reference, the battery voltage VCC should be divided by the voltage division resistor circuit with its division ratio properly selected with respect to the common reference voltage, thereby determining division voltages representing the battery voltage to be supplied to voltage comparison circuits COMP1, COMP2 and COMP4 for generation of the overcharge detection signal, the charge start voltage defection signal and the overdischarge detection signal, respectively.

The present invention can be widely utilized as the various secondary battery protection circuits each of which is required for protecting the secondary battery from the overcharge and (or) the overdischarge.

We claim:

1. A protection circuit device for protecting a secondary battery from an overcharge and an overdischarge, having first and second terminals across which a charger and a load are alternatively connectable, wherein electric current flows into said first terminal and flows out from said second terminal in a charging operation mode while electric current flows out from said first terminal and flows into said second terminal in a discharging operation mode, the device comprising:

a voltage divider having first and second ends electrically connected to said first and second terminals, respectively, a secondary battery being connectable across said first and second ends of said voltage divider to provide first and second terminal voltage signals each representative of a terminal voltage of said secondary battery;

a first detector connected to said voltage divider for receiving said first terminal voltage signal, said first detector generating an overcharge detection signal when said first terminal voltage signal exceeds a first reference voltage in the charging operation mode;

a second detector connected to said second terminal, said second comparator generating a release signal when a voltage on said second terminal exceeds a second reference voltage in the discharging operation mode;

a third detector connected to said voltage divider for receiving said second terminal voltage signal, said third detector generating an overdischarge detection signal when said second terminal voltage signal decreases below a third reference voltage in the discharging operation mode;

a series connection of first and second switches provided between said second end of said voltage divider and said second terminal;

a first diode connected in parallel with said first switch, said first diode being connected to have a forward bias direction concurrent with a direction of current flow in said discharging operation mode;

a second diode connected in parallel with said second switch, said second diode being connected to have a forward bias direction opposite to the direction of current flow in said discharging operation mode;

a first controller connected to receive said overdischarge detection signal from said first detector and said release signal from said second detector for on-off controlling said first switch, said first controller being operative to turn on said first switch to a conductive state to start a charging operation when said charger is connected across said first and second terminals, being responsive to said overcharge detection signal from said first detector to turn off said first switch in said charging operation, and being responsive to said release signal from said second detector to turn on said first switch to restore it to the conductive state when the load is connected across said first and second terminals instead of said charger; and a second controller connected to receive said overdischarge detection signal from said third detector for on-off controlling said second switch, said second controller being responsive to an absence of said overdischarge detection signal to turn on said second switch conductive to start a discharging operation when said load is connected across said first and second terminals, and being responsive to said overdischarge detection signal to turn off said second switch when said overdischarge detection signal lasts a predetermined period of time.

2. A protection circuit device according to claim 1, wherein said first, second and third reference voltages are different from each other.

3. A protection circuit device according to claim 1, wherein said first, second and third reference voltages are equal to each other.

4. A secondary battery pack comprising a secondary battery and a protection circuit device as defined in claim 1.

5. A secondary battery back according to claim 4, wherein said secondary battery is a lithium secondary battery.

6. A protection circuit device for protecting a secondary battery from an overcharge, having first and second terminals across which a charger is connectable, wherein electric current flows into said first terminal and flows out from said second terminal in a charging operation mode while electric current flows out from said first terminal and flows into said second terminal in a discharging operation mode, the device comprising:

a voltage divider having first and second ends electrically connected to said first and second terminals, respectively, a secondary battery being connectable across said first and second ends of said voltage divider to provide a terminal voltage signal representative of a terminal voltage of said secondary battery;

a first detector connected to said voltage divider for receiving said terminal voltage signal, said first detector generating an overcharge detection signal when said terminal voltage signal exceeds a first reference voltage in the charging operation mode;

a second detector connected to said second terminal, said second comparator generating a release signal when a voltage on said second terminal exceeds a second reference voltage in the discharging operation mode;

a switch connected between said second end of said voltage divider and said second terminal;

a diode connected in parallel with said switch, said diode being connected to have a forward bias direction concurrent with a direction of current flow in said discharging operation mode; and a controller connected to receive said overcharge detection signal from said first detector and said release signal from said second detector for on-off controlling said switch, said controller being operative to turn on said switch to a conductive state to start a charging operation when said charger is connected across said first and second terminals, being responsive to said overcharge detection signal from said first detector to turn off said switch in said charging operation, and being responsive to said release signal from said second detector to turn on said switch to restore it to the conductive state when the load is connected across said first and second terminals instead of said charger.

7. A protection circuit device according to claim 6, wherein said controller includes:

a third detector connected to said voltage divider for receiving therefrom another terminal voltage signal representative of said terminal voltage of said secondary battery, said third comparator generating a charge start voltage detection signal for making said switch conductive to start said charging operation when said another terminal voltage signal decreases below a third reference voltage;

an OR gate connected to receive said charge start voltage detection signal from said third detector and said release signal from said second detector; and a latch connected to be reset responsive to said overcharge detection signal from said first detector to turn off said switch and to be set responsive to an output of said OR gate to turn on said switch.

8. A protection circuit device according to claim 7, wherein said switch includes an insulated-gate field-effect transistor having its gate electrode connected to receive an output of said latch and its source-drain current path connected between said second end of the voltage divider and said second terminal.

9. A protection circuit device according to claim 8, wherein said diode is a parasitic diode formed with said insulated-gate field-effect transistor.

10. A protection circuit device according to claim 8, wherein said diode is a diode separately provided from said insulated-gate field-effect transistor.

11. A protection circuit device according to claim 6, wherein said first detector includes a comparator having a first input terminal connected to said voltage divider and a second input terminal for receiving said first reference voltage.

12. A protection circuit device according to claim 6, wherein said second detector includes a comparator having a first input terminal connected to said second terminal and a second input terminal for receiving said second reference voltage.

13. A protection circuit device according to claim 6, wherein said second detector includes a series connection of an insulated-gate field-effect transistor and an inverter, said transistor having its gate electrode connected to said second terminal, its source electrode connected to said second end of said voltage divider and its drain electrode connected to said inverter and having a threshold voltage lower than said second reference voltage.

14. A protection circuit device according to claim 6, wherein the device further comprises a resistor connected between said second terminal and said second detector.

15. A protection circuit device for protecting a secondary battery from an overdischarge, having first and second terminals across which a load is connectable, wherein electric current flows out from said first terminal and flows into said second terminal in a discharging operation mode, the device comprising:

a voltage divider having first and second ends electrically connected to said first and second terminals, respectively, a secondary battery being connectable across said first and second ends of said voltage divider to provide a terminal voltage signal representative of a terminal voltage of said secondary battery;

a detector connected to said voltage divider for receiving said terminal voltage signal, said detector generating an overdischarge detection signal when said terminal voltage signal decrease below a reference voltage in the discharging operation mode;

a switch connected between said second end of said voltage divider and said second terminal;

a diode connected in parallel with said switch, said diode being connected to have a forward bias direction opposite to a direction of current flow in said discharging operation mode; and a controller connected to receive said overdischarge detection signal from said detector for on-off controlling said switch, said controller being responsive to an absence of said overdischarge detection signal to turn on said switch to start a discharging operation when said load is connected across said first and second terminals, and being responsive to said overdischarge detection signal to turn off said switch when said overdischarge detection signal lasts a predetermined period of time.

16. A protection circuit device according to claim 15, wherein said controller includes:

a timer including an oscillator for generating clock pulses and being responsive to said overdischarge detection signal from said detector to start count pulses from said oscillator and to generate a pulse count signal when pulses from said oscillator have been counted for said predetermined period of time; and a latch reset responsive to absence of said overdischarge detection signal from said detector to make said switch conductive and set responsive to said pulse count signal from said timer to make said switch non-conductive.

17. A protection circuit device according to claim 16, wherein said timer further includes:

an exclusive OR gate having a first input terminal connected to receive pulses from said oscillator and a second input terminal; and a counter to receive an output of said exclusive OR gate to generate said pulse count signal to be supplied to said latch, a partial output of said counter being supplied to said second input terminal of said exclusive OR gate after said predetermined period of time has elapsed.

18. A protection circuit device according to claim 16, wherein said switch includes an insulated-gate field-effect transistor having its gate electrode connected to receive an output of said latch and its source-drain current path connected between said second end of the voltage divider and said second terminal.

19. A protection circuit device according to claim 18, wherein said diode is a parasitic diode formed with said insulated-gate field-effect transistor.

20. A protection circuit device according to claim 18, wherein said diode is a diode separately provided from said insulated-gate field-effect transistor.

21. A protection circuit device according to claim 15, wherein said detector includes a comparator having a first input terminal connected to said voltage divider and a second input terminal for receiving said reference voltage.

\* \* \* \* \*